Feb. 6, 1951     D. R. TASHJIAN     2,541,009
RADAR APPARATUS
Filed July 3, 1948
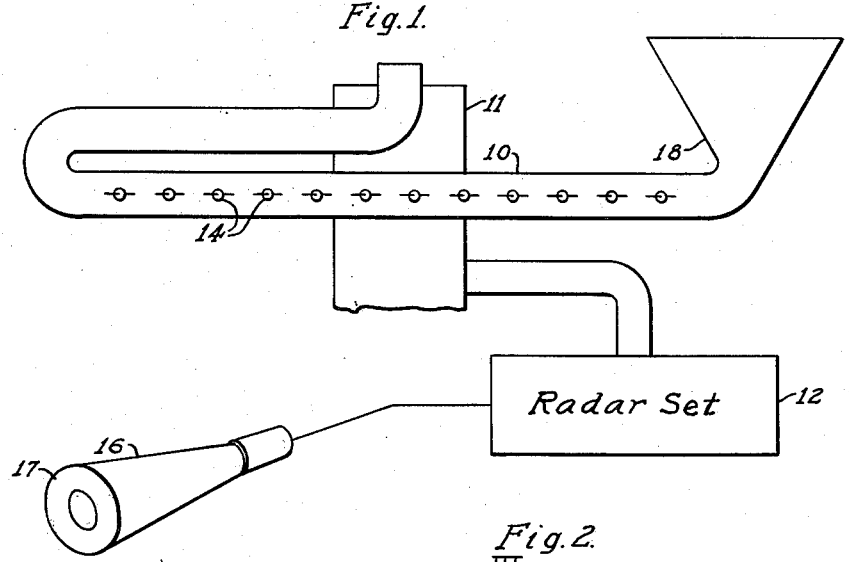
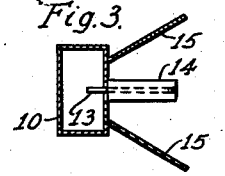
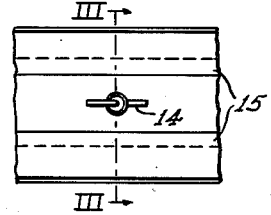
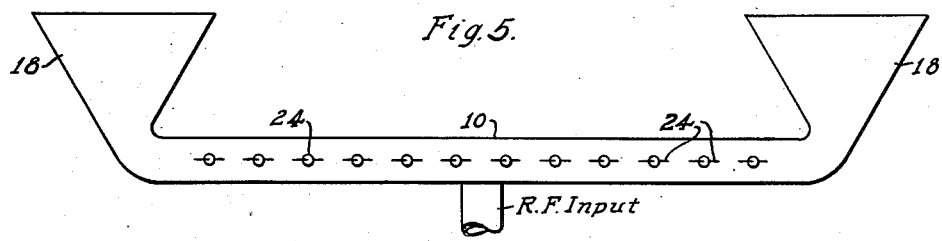
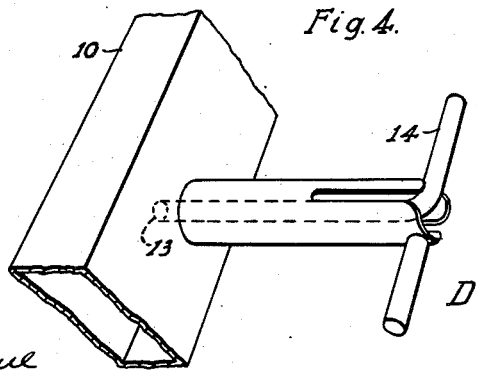
INVENTOR
David R. Tashjian.
BY
F. E. Browder
ATTORNEY Patented Feb. 6, 1951

2,541,009

UNITED STATES PATENT OFFICE 2,541,009

RADAR APPARATUS

David R. Tashjian, Baltimore, Md., assignor, by mesne assignments, to the United States of America as represented by the Secretary of the Navy Application July 3, 1948, Serial No. 37,011

9 Claims. (Cl. 250—33.53)

This invention relates to search-radar systems, and it has as an object the simplification of such systems.

Search-radar systems are used on ships for tracking the positions of airplanes, relative to the ships. Usually, two search systems are used on each ship. The system which tracks the airplanes approaching the ship has a blind spot overhead the ship, requiring another system for tracking the airplanes directly over the ship.

The system which tracks the airplanes approaching the ship, may be termed an azimuth system and usually has a search antenna rotating in a horizontal plane, with reflectors providing high angle coverage permitting the airplanes to be tracked-in close to the ship. Such a search antenna ordinarily includes a transmission line, which may be in the form of a wave guide, with a series of radiators spaced along its length, and fed with radio-frequency energy from one end of the wave guide, the opposite end forming a dissipative load. In certain cases, the antenna may be fed at the center, dissipative loads being used at each end. Since such an antenna will not scan the area directly overhead, it is customary to use a separate search system, which may be termed a zenith system, and which has an antenna looking into the space directly overhead for searching such space.

This invention omits the dissipative loads in the ends of the transmission lines of search antennas of search-radar systems, and the transmission lines at such ends are bent upwardly and have electromagnetic horns, or other types of radiators, attached thereto, for radiating the power formerly wasted in the dissipative loads, upwardly for searching the space directly overhead the ships. The same oscilloscope, which would be used for tracking the airplanes approaching the ship, is used for observing the positions of the airplanes directly overhead the ship. The efficiency of operation is thereby increased. Other advantages of this invention are the use of one radar set for each ship instead of the two formerly used, and reductions in the cost, the weight, and the space required for the equipment, and reductions in the personnel required to operate the equipment.

Another object of the invention is to increase the efficiency of search-radar systems.

Another object of the invention is to combine a zenith-search radar system with an azimuth-search radar system.

Other objects of the invention are to reduce the cost and the weight of search-radar systems, the space required for such systems, and the personnel required to operate same.

The invention will now be described with reference to the drawing of which:

Figure 1 is a diagrammatic view of a search-radar system embodying this invention, the reflectors for the radiators spaced the length of the wave guide, being omitted for clearness of illustration;

Fig. 2 is a fractional view of the wave guide of Fig. 1 illustrating the reflectors used;

Fig. 3 is a sectional view along the lines III—III of Fig. 2;

Fig. 4 is an enlarged, perspective view of one of the dipole radiators and the feed conductor connected thereto, and Fig. 5 is a diagrammatic view, in reduced scale, of a modified transmitting antenna which may be used, the transmission line being fed in the center, and electromagnetic horns being provided at the two ends of the transmission line.

The transmission line illustrated, is a wave guide 10 supported for horizontal rotation upon the pedestal 11, and is fed through one end in the conventional manner, with radio-frequency energy from the conventional radar set 12. Energy is connected from the wave guide 10 to the spaced-dipole radiators 14 by probes 13 which project into the wave guide and feed the radiators in phase. The wave guide has the reflectors 15 above and below the dipole radiators and which direct the radiated energy in a wide-angle pattern.

The radar set has a conventional oscilloscope 16 upon the screen 17 of which, the echo dots reflected from airplanes approaching the ship indicate the presence and the positions of the airplanes.

The construction described in the foregoing in connection with the drawing is conventional. If, however, the wave guide were constructed in the conventional manner, it would have in its end opposite the end in which the energy is supplied, a conventional dissipative load, which is not illustrated, and which would waste from about 5% to 10% of the radio-frequency power. The system described could not search the area overhead the ship, requiring a separate system, which is not illustrated, for searching such area.

The invention provides a search antenna having a transmission line fed at one end and having no dissipative load in its other end, which instead, is turned upwardly and provided with a radiator for radiating the energy formerly wasted in the dissipative load upwardly into the space not covered by the energy radiated from the radiators 14. In the embodiment of the invention illustrated by the drawing, the additional radiator is in a form of an upwardly directly electromagnetic horn 18, the radiation pattern of which preferably would be arranged to complement that from the dipoles 14, whereby all of the space around and overhead the ship would be continuously searched.

The pattern of the horn 18 could be made to be a flat oval, in which case an airplane approaching the space directly overhead would give two echoes for each revolution of the antenna so that the presentation on the oscilloscope screen would consist of two arcs of a circle, the arcs growing longer and joining as the airplane gets directly overhead, to form a circle in the center of the screen, the radius of the circle being proportional to the height of the airplane. The space around the center of the oscilloscope screen would show echo dots resulting from reflections from airplanes in the space scanned by the dipole radiators 14.

Fig. 5 illustrates a modification of a search antenna in which a wave guide 10 would be fed at its center and would have horns 18 at both ends, instead of the dissipative loads which were formerly provided in the ends of wave guides which were fed at their centers. The radiators 24, spaced along the length of the wave guide of Fig. 5, could be dipoles similar to those of Figs. 1 to 4 of the drawing which could be probe or loop fed, or could be slots in the wave guide, or T stubs.

Likewise, the radiators 14 of Figs. 1 to 4 need not necessarily be dipoles, as illustrated, but could be slots or T stubs. Such radiators are used in what are known generally as "leaky transmission lines," and any such transmission line could be used in the practice of this invention.

In the operation of a search-radar system embodying this invention, the wave guide 10 would be rotated in a conventional manner, and the echo dots, resulting from the reflections from airplanes approaching the ship, of energy transmitted by the radiators 14, would appear in the oscilloscope screen in an annular space around the center thereof. The echo dots, resulting from the airplanes flying directly overhead the ships, would appear in the center of the oscilloscope, whereby one operator would, through observing one oscilloscope, note the positions of all airplanes approaching the ship and flying directly overhead same. Thus, the personnel required for operation of the search system would be reduced, as would the space it requires, and its weight and cost.

I claim as my invention:

1. An antenna for a radar system comprising a transmission line having a plurality of radiators spaced along its length for transmitting energy in one direction, and having a radiator at one end for transmitting energy in another direction.

2. An antenna for a radar system comprising a wave guide having a plurality of radiators spaced along its length for transmitting energy in one direction, and having a radiator at one end for transmitting energy in another direction.

3. An antenna for a radar system comprising a transmission line adapted to be rotated in a substantially horizontal plane, and having a plurality of radiators spaced along its length, and having an up-turned end with a radiator thereon.

4. An antenna for a radar system comprising a transmission line adapted to be rotated in a substantially horizontal plane, and having a plurality of radiators spaced along its length, and having an up-turned end with an upwardly directed electromagnetic horn thereon.

5. An antenna for a radar system comprising a wave guide adapted to be rotated in a substantially horizontal plane, and having a plurality of radiators spaced along its length, and having an up-turned end with a radiator thereon.

6. An antenna for a radar system comprising a wave guide adapted to be rotated in a substantially horizontal plane, and having a plurality of radiators spaced along its length, and having an up-turned end with an upwardly directed electromagnetic horn thereon.

7. A combined azimuth and zenith search-radar system, comprising a radar set and a transmission line connected thereto, said line being adapted to be rotated in a substantially horizontal plane, and having a plurality of radiators spaced along its length for providing an azimuth-search pattern, and having one end turned upwardly and having a radiator thereon for providing a zenith-search pattern.

8. A combined azimuth and zenith search-radar system comprising a radar set and a wave guide connected thereto, said guide being adapted to be rotated in a substantially horizontal plane, and having a plurality of radiators spaced along its length for providing an azimuth-search pattern, and having one end turned upwardly and having a radiator thereon for providing a zenith-search pattern.

9. A combined azimuth and zenith search-radar system comprising a radar set and a wave guide connected thereto, said guide being adapted to be rotated in a substantially horizontal plane, and having a plurality of radiators spaced along its length for providing an azimuth-search pattern, and having one end turned upwardly and having a vertically directed electromagnetic horn thereon for providing a zenith-search pattern.

DAVID R. TASHJIAN.

REFERENCES CITED

The following references are of record in the file of this patent:

UNITED STATES PATENTS

| Number | Name | Date |
|---|---|---|
| 2,248,215 | Budenbom | July 8, 1941 |
| 2,426,228 | Mackta | Aug. 26, 1947 |